Figure 1:
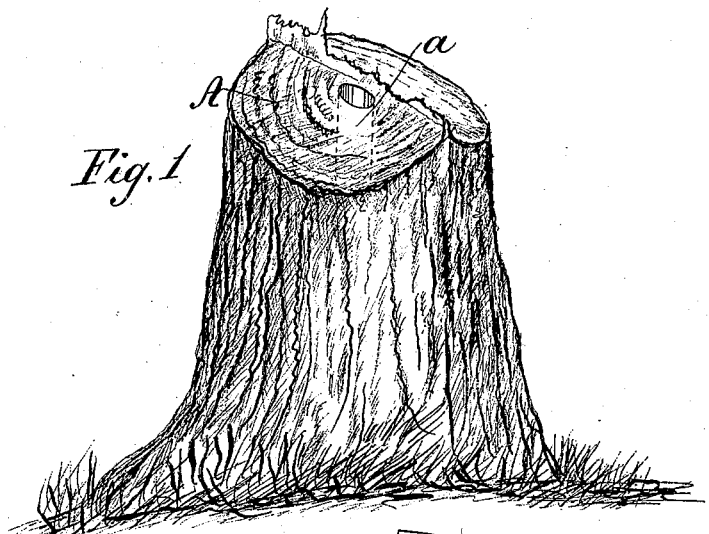
Figure 2:
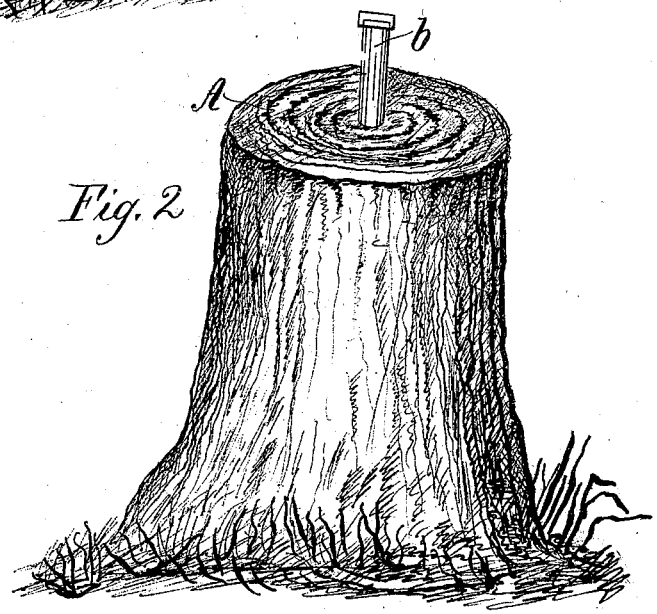

Canfield & Willard.
Clearing Land of Stumps.

Nº 97,272. Patented Nov. 30, 1869.

Witnesses
Wm. H. Pyle
Leonard C. Ramington

Inventor
Charles Canfield
Henderson Willard

United States Patent Office.

CHARLES CANFIELD AND HENDERSON WILLARD, OF GRAND RAPIDS, MICHIGAN.

Letters Patent No. 97,272, dated November 30, 1869; antedated November 18, 1869.

IMPROVED DEVICE FOR CLEARING LAND OF STUMPS.

The Schedule referred to in these Letters Patent and making part of the same.

*To all whom it may concern:*

Be it known that we, CHARLES CANFIELD and HENDERSON WILLARD, both of the city of Grand Rapids, Kent county, Michigan, have invented a certain new and useful Method of Ridding Land of Stumps and other obstinate obstructions of wood; and do declare the following to be a full, clear, and exact description thereof.

Our invention consists in the use of metallic cups and the petroleum of commerce in its various forms, by means of which stumps and other obstructions of wood are prepared for combustion and complete destruction by fire, with little labor and small expense.

The manner of applying our invention to stumps, where it is chiefly valuable, is first to drive, slightly, one or more metallic cups or tubes into the top of the stump to be operated upon, to receive the petroleum.

These cups may be made of sheet-iron, in the form of a hollow cylinder, open at both ends, about three inches in diameter and long enough to hold a quart of liquid.

From one to four of these cups may be applied to a stump to advantage, according to size of stump, and from one to four quarts of petroleum, crude or refined, or benzine, will be sufficient to saturate the pores of the stump, and render it highly combustible, in a length of time varying from three to nine weeks, according to the kind of wood and its dryness.

The process of filling the cups after they are adjusted is so simple as not to require explaining. The priming will soon disappear from the cups into the pores of the wood, when the cups may be removed to other stumps at pleasure.

When the stump is ready to be fired, a lighted match applied to any part of it, except the bark, will soon wrap it in a flame that will not cease until every particle of the woody fibre, including the roots, shall be consumed. Holes may be bored to receive the priming, but that is slow and laborious.

These cups, on account of their cheapness and the ease and rapidity with which they may be adjusted, and the great number of stumps that one or two of them will serve in one season, render their use a matter of economy. One or two strokes of the mallet will adjust a cup, and one man can adjust the cups on several hundred stumps in one day.

The work of filling the cups is nearly as quick and easy. Where a large number of stumps are to be primed, a team should be provided to haul the petroleum by the barrel to the most convenient place or places in the field.

It is economy to provide each cup with an adjustable cover, to prevent waste of priming from evaporation.

Having thus described our invention,

What we claim as new, and desire to secure by Letters Patent, is—

The metallic cup, constructed substantially as described, and for the purpose set forth.

In testimony that we claim the foregoing, we have hereunto set our hands, this 4th day of March, A. D. 1869.

CHARLES CANFIELD.
HENDERSON WILLARD.

Witnesses:
OMAR H. SIMONDS,
MARK M. POWERS.